Dec. 3, 1968   R. B. HAY   3,414,339

OIL-FREE BEARING ASSEMBLY

Filed April 4, 1966   2 Sheets-Sheet 1

Dec. 3, 1968 R. B. HAY 3,414,339

OIL-FREE BEARING ASSEMBLY

Filed April 4, 1966 2 Sheets-Sheet 2

United States Patent Office 3,414,339
Patented Dec. 3, 1968

3,414,339
OIL-FREE BEARING ASSEMBLY
Robert B. Hay, 100 Appleton St.,
North Andover, Mass. 01845
Filed Apr. 4, 1966, Ser. No. 539,692
3 Claims. (Cl. 308—26)

ABSTRACT OF THE DISCLOSURE

A bearing assembly in which the bearing is simply and quickly, yet firmly mounted in a housing and which can accommodate housings of different dimensions. The assembly comprises a bearing having at least three spaced grooves about the sleeve thereof, a resilient mounting which fits snugly about said sleeve and is positioned between at least two of said grooves, a housing having an aperture therein which aperture fits snugly about said resilient mounting to give a friction fit, a washer about said sleeve on each side of said aperture, and a snap ring pressing against the outside of each washer, said snap ring being positioned and being held firmly in place by said grooves in said sleeve.

---

The mounting of bearings firmly in a housing has been accomplished in many ways. In general, however, the resulting assemblies are relatively bulky, expensive, and limited in flexibility. In accordance with the present invention, however, a bearing assembly is provided which is simply and quickly constructed, and which results in a reliable, trouble free mounting.

Accordingly, it is a principal object of the present invention to provide a novel and improved bearing assembly.

It is another object of the present invention to provide a bearing assembly which will readily accommodate housings of varying dimensions.

It is another object of the present invention to provide a bearing assembly which can be quickly assembled and disassembled.

It is another object of the present invention to provide a bearing assembly which comprises simple and inexpensive components.

Other objects of this invention will in part be obvious and will in part appear hereinafter.

The assembly of the present invention comprises a bearing having at least two appropriately spaced grooves about the sleeve thereof, a resilient mounting which fits snugly about said sleeve and is positioned between at least two of said grooves, a housing having an aperture therein which aperture fits snugly about said resilient mounting to give a friction fit, a washer about said sleeve on each side of said aperture, and a snap ring pressing against the outside of each washer, said snap ring being positioned and being held firmly in place by said grooves in said sleeve.

A better and more complete understanding of the present invention can be had by reference to the following detailed description in connection with the accompanying illustrative drawings wherein.

Figure 1:
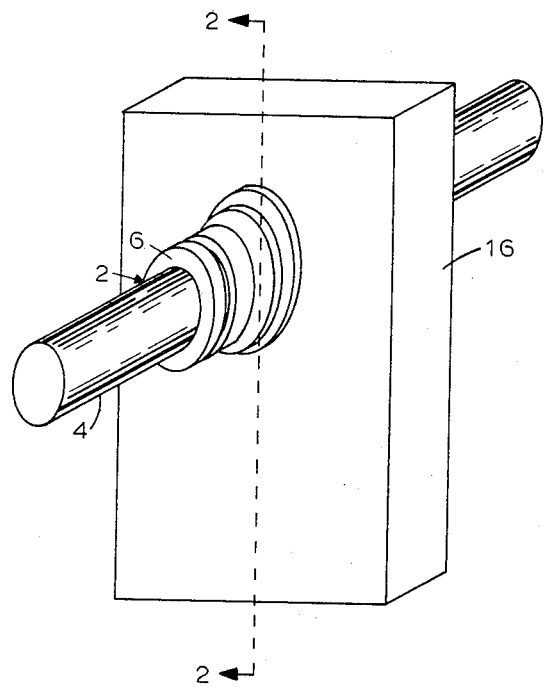
FIGURE 1 is a perspective view of the bearing assembly of this invention.
Figure 2:
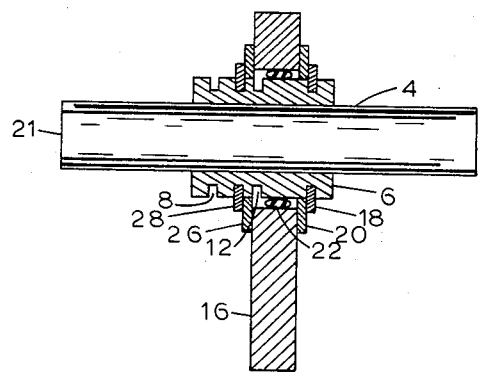
FIGURE 2 is a cross-sectional view of the bearing assembly illustrated in FIGURE 1 taken along the lines 2—2.
Figure 3:
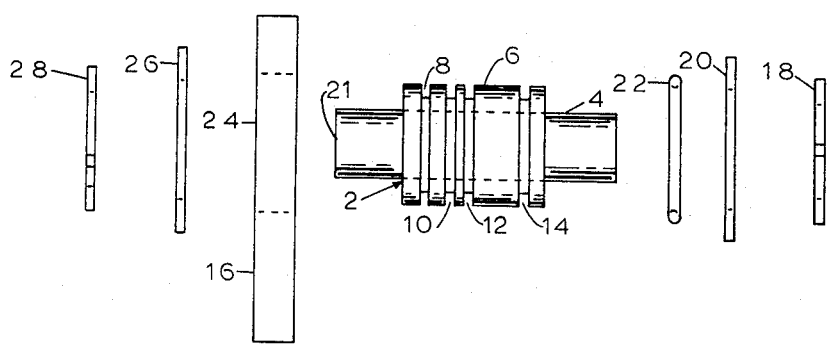
FIGURE 3 is an exploded, disassembled view of the bearing assembly illustrated in FIGURE 1.

Referring now to FIGURES 1–3, there is illustrated a typical bearing assembly comprising shaft 4 and sleeve 6, which shaft can rotate, slide or both relative to the sleeve, or which shaft can be stationary while the sleeve rotates, slides or both relative to the shaft. The dimensions given being entirely illustrative, bearing 2 comprising shaft 4 and sleeve 6 has impressed upon sleeve 6, for example by machining, a number of grooves; grooves 8 and 10 being 0.177 inch apart, groove 12 being 0.24 inch from groove 8 and groove 14 being 0.42 inch from groove 8. (All distances are to the outside edge of the respective grooves, the grooves each having a width of 0.022 inch.)

In order to secure bearing 2 to housing 16 which has a thickness of 0.125 inch, snap ring 18 is sprung into groove 14. Washer 20 is then passed over end 21 of shaft 4 and then sleeve 6 until said washer comes to rest against snap ring 18. Note that washer 20 is large enough to pass over sleeve 6 but not large enough to pass over snap ring 18. In the same manner resilient mounting 22 is then placed in position about sleeve 6 and against washer 20 and sleeve 6 is inserted into aperture 24 of housing 16 so that resilient mounting 22 is firmly "squashed" between housing 16 and sleeve 6 to form a friction fit. Subsequently, washer 26 is passed over end 21 and placed against aperture 24 and housing 16 followed by snap ring 28 which snaps into position in groove 10, completing the assembly.

Note that in order for the illustrated bearing assembly to assemble properly, the width of washers 20 and 26 and snap rings 18 and 28 must be carefully taken into account in the positioning of grooves 10 and 14. The washers utilized in the above illustration have a width of 0.030 inch and the snap rings have a width of 0.018 inch. In any particular case, absolute width of the washers and snap rings is unimportant so long as the grooves in the sleeve are positioned so that the washers are held snugly against the housing by the snap rings.

Moreover, once washers and snap rings of a particular thickness are chosen, as was the case in the above illustrative example and in the accompanying drawings, additional grooves such as 8 and 12, can be positioned on sleeve 6 so that a housing having any thickness such as a thickness of 0.063 inch or 0.25 inch can be readily accommodated with the identical components with no more effort than a simple disassembly and reassembly.

In order for the assembly of the present invention to function properly, resilient mounting 22 must be of the proper size to be firmly "squashed" or "crushed" between housing 16 and sleeve 6 to form a friction fitting. The friction fit thus accomplished prevents sleeve 6 from rotating relative to housing 16. In this connection, washers 20 and 26 serve not only to prevent lateral movement of sleeve 6 relative to housing 16 but also help to maintain resilient mounting 22 in position between housing 16 and sleeve 6 and thus to maintain the resilient mounting under pressure.

The material of construction of the resilient mounting is not critical. Said mounting can be a simple rubber O-ring or can be oval or cylindrical in shape. Also, if desired, two or more resilient mountings can be utilized simultaneously. The major requirement is that the mounting be resilient for easy mounting and so that when placed under pressure between the sleeve and the housing, a high rotational coefficient of friction is produced which will prevent rotation of sleeve 6 relative to the housing.

The materials of construction of the washers, snap rings, housings, etc. are also not critical. Any metal, plastic or the like which is strong enough to withstand the intended use and which can be appropriately shaped is entirely suitable for the purposes of the present invention.

Likewise the construction of the bearing does not constitute a part of the present invention. Thus any bearing can be secured in accordance with the present invention.

The bearing assembly of the present invention appears simple, and it is. Simplicity and ease of assembly are amongst its most desirable features. However, as is obvious, and as is explained above, the present bearing assembly possesses other desirable features.

What is claimed is:

1. A novel bearing assembly which comprises a bearing comprising a shaft and a sleeve having at least three grooves on the exterior surface thereof, a resilient mounting about said sleeve positioned between two of said grooves, a housing having an aperture therein, said aperture positioned about said resilient mounting to form a friction fit with said sleeve, a washer positioned about said sleeve on each side of said housing, and a snap ring positioned about said sleeve outside of each washer, each of said snap rings being sprung into one of said two grooves.

2. The bearing assembly of claim 1 wherein said resilient mounting is an O-ring.

3. The bearing assembly of claim 1 wherein the grooves in said sleeve are positioned to accommodate housings having a width of 0.125 and 0.25 inch.

References Cited

UNITED STATES PATENTS

| 1,418,379 | 6/1922 | Karle | 308—236 |
| 2,188,862 | 1/1940 | Horger | 308—26 X |
| 3,073,654 | 1/1963 | Richey | 308—26 |
| 3,107,946 | 10/1963 | Drake | 308—26 X |

FREDERICK L. MATTESON, Jr., *Primary Examiner.*

ROBERT A. DUA, *Assistant Examiner.*